US011435220B2

(12) United States Patent
Kamigaito et al.

(10) Patent No.: US 11,435,220 B2
(45) Date of Patent: Sep. 6, 2022

(54) COMBINATION WEIGHING DEVICE WITH SELECTABLE WEIGHING HOPPERS

(71) Applicant: Ishida Co., Ltd., Kyoto (JP)

(72) Inventors: Satoru Kamigaito, Ritto (JP); Hiroki Murakami, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 600 days.

(21) Appl. No.: 16/450,502

(22) Filed: Jun. 24, 2019

(65) Prior Publication Data
US 2020/0072656 A1    Mar. 5, 2020

(30) Foreign Application Priority Data

Aug. 31, 2018   (JP) .............................. JP2018-163444

(51) Int. Cl.
*G01G 13/29*       (2006.01)
*G01G 13/00*       (2006.01)
(Continued)

(52) U.S. Cl.
CPC ........... *G01G 13/29* (2013.01); *G01G 13/003* (2013.01); *G01G 19/387* (2013.01); *G01G 19/393* (2013.01)

(58) Field of Classification Search
CPC .... G01G 13/29; G01G 13/003; G01G 19/387; G01G 19/393
(Continued)

(56) References Cited

U.S. PATENT DOCUMENTS 4,398,612 A *  8/1983  Mikami ............... G01G 19/343
                                                          222/196
4,421,185 A * 12/1983  Koto .................... G01G 13/022
                                                          177/121
(Continued)

FOREIGN PATENT DOCUMENTS

CN        85108288 A        4/1986
CN        2045848 U        10/1989
(Continued)

OTHER PUBLICATIONS

Translation 2017138188—(Year: 2017).*
(Continued)

*Primary Examiner* — Alexander A Mercado
*Assistant Examiner* — Monica S Young
(74) *Attorney, Agent, or Firm* — Studebaker & Brackett PC

(57) ABSTRACT

A combination weighing device includes: a conveyance unit; a plurality of first hoppers each receiving the article; a plurality of second hoppers detachably provided on a downstream side of the plurality of first hoppers, and each receiving the article; a weighing unit weighing the article held in each of the plurality of second hoppers; and a control unit performing combination calculation and discharging the article from the second hopper corresponding to the combination. The control unit performs combination calculation based on a weighing value corresponding to mass of the article held in each of the plurality of second hopper, and continues combination calculation based on a weighing value corresponding to mass of the article held in each of the second hoppers other than a part of the second hoppers in a state in which the part of the plurality of second hoppers has been removed.

12 Claims, 6 Drawing Sheets

(51) Int. Cl.
*G01G 19/387* (2006.01)
*G01G 19/393* (2006.01)

(58) Field of Classification Search
USPC .................................................. 177/25.18
See application file for complete search history.

(56) References Cited

U.S. PATENT DOCUMENTS

| | | | | |
|---|---|---|---|---|
| 4,515,231 A * | 5/1985 | Ishida | ............... | G01G 13/026 |
| | | | | 177/25.18 |
| 4,569,446 A * | 2/1986 | Kelley | ............... | B07B 1/469 |
| | | | | 209/660 |
| 4,609,058 A * | 9/1986 | Sashiki | ............... | G01G 19/393 |
| | | | | 177/63 |
| 4,678,046 A * | 7/1987 | Mosher | ............... | G01G 19/393 |
| | | | | 177/1 |
| 4,683,966 A * | 8/1987 | Nakagawa | ............... | G01G 13/02 |
| | | | | 177/25.18 |
| 4,727,947 A * | 3/1988 | Naito | ............... | G01G 19/32 |
| | | | | 177/1 |
| 5,211,253 A * | 5/1993 | Davis, Jr. | ............... | G01G 19/393 |
| | | | | 177/1 |
| 5,379,923 A * | 1/1995 | Sagastegui | ............... | G01G 13/18 |
| | | | | 222/181.2 |
| 5,736,684 A * | 4/1998 | Fujitani | ............... | G01G 19/42 |
| | | | | 177/25.18 |
| 2005/0039614 A1* | 2/2005 | Konishi | ............... | G01G 19/393 |
| | | | | 99/486 |

FOREIGN PATENT DOCUMENTS

| | | |
|---|---|---|
| CN | 101273250 A | 9/2008 |
| CN | 101421596 A | 4/2009 |
| CN | 101788328 A | 7/2010 |
| CN | 203893927 U | 10/2014 |
| CN | 105806459 A | 7/2016 |
| CN | 107209048 A | 9/2017 |
| CN | 107705436 A | 2/2018 |
| CN | 108369133 A | 8/2018 |
| EP | 0075479 A2 | 3/1983 |
| EP | 0 615 114 A1 | 9/1994 |
| JP | H09-053976 A | 2/1997 |
| JP | 2005-055187 A | 3/2005 |
| JP | 2007-010448 A | 1/2007 |
| JP | 2017138188 A * | 8/2017 |
| JP | 2018-109528 A | 7/2018 |

OTHER PUBLICATIONS

The extended European search report issued by the European Patent Office dated Dec. 11, 2019, which corresponds to European Patent Application No. 19177191.4.

Wang Yangxin, "Study and Realization of Control System of Weighing Combined Balance Based on Programmable Logic Controller", Graduate Degree Thesis of Tianjin University of Science and Technology, China, May 16, 2015, total 77 pages, with English language abstract.

* cited by examiner

COMBINATION WEIGHING DEVICE WITH SELECTABLE WEIGHING HOPPERS

TECHNICAL FIELD

One aspect of the present invention relates to a combination weighing device.

BACKGROUND

There is known a combination weighing device which charges articles into a plurality of hoppers, and performs combination calculation for the article held in each of the plurality of hoppers (e.g., see Japanese Unexamined Patent Publication No. 2005-55187).

SUMMARY

When an abnormal condition of any of the hoppers is caused by biting of the article or for other reasons during weighing, the combination weighing device of the above technology needs to be stopped to eliminate the abnormal condition. In this case, an operation rate of the combination weighing device may drop.

Accordingly, one aspect of the present invention is to provide a combination weighing device capable of reducing an operation rate drop of the device.

A combination weighing device according to one aspect of the present invention comprises: a conveyance unit configured to convey an article; a plurality of first hoppers each configured to receive the article conveyed by the conveyance unit, temporarily hold the received article, and then discharge the article downstream; a plurality of second hoppers detachably provided on a downstream side of the plurality of first hoppers, and each configured to receive the article discharged from corresponding one of the plurality of first hoppers, temporarily hold the received article, and then discharge the article downstream; a weighing unit configured to weigh the article held in each of the plurality of second hoppers, and obtain a weighing value corresponding to mass of the article; and a control unit configured to perform combination calculation to select such a combination of weighing values a total value of which becomes a target weighing value, and discharge the article from the second hopper corresponding to the combination. The control unit performs the combination calculation based on the weighing value corresponding to the mass of the article held in each of the plurality of second hoppers. In a state in which a part of the second hoppers has been removed from the plurality of second hoppers, the control unit continues the combination calculation based on the weighing value corresponding to the mass of the article held in each of the plurality of second hoppers other than the part of the second hoppers.

According to the combination weighing device, the control unit performs combination calculation based on a weighing value corresponding to mass of the article held in each of the plurality of second hoppers, and continues combination calculation based on a weighing value corresponding to mass of the article held in each of the second hoppers other than a part of the second hoppers in a state in which the part of the plurality of second hoppers has been removed. Accordingly, even in a state in which a part of the second hoppers has been removed to eliminate an abnormal condition currently caused, for example, combination calculation can be continued based on the second hoppers other than the part of the second hoppers without stopping the combination weighing device. Accordingly, an operation rate drop is avoidable.

According to the combination weighing device of one aspect of the present invention, the weighing unit may perform zero point correction of the weighing value obtained by the weighing unit and corresponding to the mass of the article held in the part of the second hoppers when the part of the second hoppers after removal is attached. In this case, execution of zero point correction of the weighing values of the part of the second hoppers (hereinafter also simply referred to as "zero point correction"), and reduction of a zero point error of the weighing unit are achievable without stopping the combination weighing device after the part of the second hoppers are attached.

According to the combination weighing device of one aspect of the present invention, the control unit may continue the combination calculation based on the weighing value corresponding to the mass of the article held in each of the plurality of second hoppers including a part of the second hoppers when the weighing unit performs zero point correction. In this case, the part of the second hoppers can be again added to combination calculation without stopping the combination weighing device after attachment of the part of the second hoppers and zero point correction by the weighing unit.

When removal of a part of the second hoppers included in the plurality of second hoppers is detected in the combination weighing device of one aspect of the present invention, the control unit may start combination calculation based on a weighing value corresponding to mass of the article held in each of the second hoppers other than the part of the second hoppers. In this manner, combination calculation based on the weighing value corresponding to the mass of the article held in each of the second hoppers other than the part of the second hoppers can be started in response to the removal of the part of the second hoppers.

When an error of a part of the second hoppers included in the plurality of second hoppers is detected in the combination weighing device of one aspect of the present invention, the control unit may start combination calculation based on a weighing value corresponding to mass of the article held in each of the second hoppers other than the part of the second hoppers. In this manner, combination calculation based on the weighing value corresponding to the mass of the article held in each of the second hoppers other than the part of the second hoppers can be started in response to the error of the part of the second hoppers.

When an operation for removing a part of the second hoppers included in the plurality of second hoppers from the combination calculation is input in the combination weighing device of one aspect of the present invention, the control unit may start combination calculation based on a weighing value corresponding to mass of the article held in each of the second hoppers other than the part of the second hoppers. In this manner, combination calculation based on the weighing value corresponding to the mass of the article held in each of the second hoppers other than the part of the second hoppers can be started in response to input of the operation for removing the part of the second hoppers from combination calculation.

In a state in which a part of the second hoppers has been removed, the control unit of the combination weighing device of one aspect of the present invention may stop a discharging operation of the first hopper on the upstream side of the part of the second hoppers, and a conveying operation of the conveyance unit on the upstream side of the part of the second hoppers. In this manner, continuous supply of the articles to the attachment positions of the articles even after removal of the part of the second hoppers is avoidable.

The combination weighing device of one aspect of the present invention may further comprise a notification unit configured to give notification about the error of the part of the second hoppers included in the plurality of second hoppers. In this case, an error of a part of the second hoppers included in the plurality of second hoppers can be easily checked. Accordingly, the part of the second hoppers can be easily removed from the plurality of second hoppers, for example.

According to the combination weighing device of one aspect of the present invention, each of the plurality of first hoppers may be detachably provided on a downstream side of the conveyance unit. In a state of removal of a part of the first hoppers included in the plurality of first hoppers, the control unit may continue the combination calculation based on the weighing value corresponding to the mass of the article held in each of the second hoppers other than the second hopper on the downstream side of the part of the first hoppers. In this case, combination calculation can continue even in the state in which the part of the first hoppers has been removed from the plurality of first hoppers. Accordingly, an operation rate drop of the combination weighing device is avoidable.

The combination weighing device of one aspect of the present invention may further comprise a plurality of third hoppers detachably provided on a downstream side of the plurality of second hoppers, and each configured to receive the article discharged from corresponding one of the plurality of second hoppers, temporarily hold the received article, and then discharge the article downstream. In a state of removal of a part of the third weighing hoppers included in the plurality of third weighing hoppers, the control unit may continue the combination calculation based on the weighing value corresponding to the mass of the article held in each of the second hoppers other than the second hopper on an upstream side of the part of the third hoppers. In this case, combination calculation can continue even in the state in which the part of the third hoppers has been removed from the plurality of third hoppers. Accordingly, an operation rate drop of the combination weighing device is avoidable.

DETAILED DESCRIPTION

An embodiment will be hereinafter described in detail with reference to the drawings. Note that identical or similar elements in the respective figures are given identical reference numbers, and the same description is not repeated.

Figure 1:
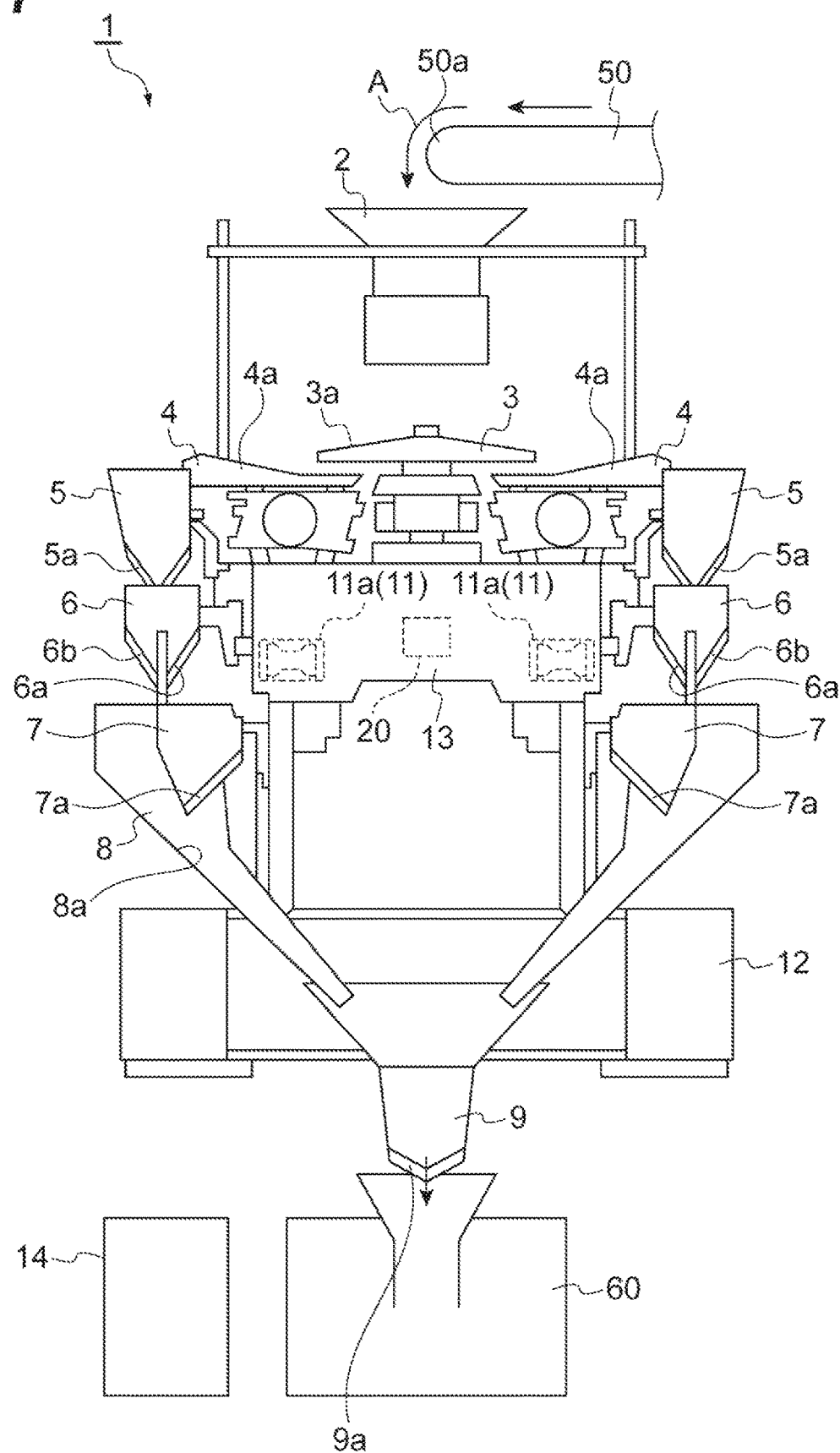
FIG. 1 is a configuration diagram of a combination weighing device according to an embodiment.

As shown in FIG. 1, a combination weighing device 1 includes a charge chute 2, a dispersion feeder 3, a plurality of radial feeders (conveyance unit) 4, a plurality of pool hoppers (first hoppers) 5, a plurality of weighing hoppers (second hoppers) 6, a plurality of booster hoppers 7 (third hoppers), a collection chute 8, a timing hopper 9, a weighing unit 11, a frame 12, a case 13, a notification unit 14, and a control unit 20.

The combination weighing device 1 weighs an article A (article having variations in single mass, such as agricultural article, marine article, and processed food) supplied by a conveyor 50 to adjust a weight of the article A to a target weighing value, and supplies the article A to a bag forming and packaging machine 60. Note that the bag forming and packaging machine 60 packs the article A supplied from the combination weighing device 1 while forming a film into a bag having a predetermined volume.

The charge chute 2 is disposed below a conveyance end 50a of the conveyor 50. The charge chute 2 receives the article A dropped from the conveyance end 50a of the conveyor 50, and discharges the article A downstream. The charge chute 2 is directly or indirectly supported by the case 13 supported on the frame 12.

The dispersion feeder 3 is disposed below the charge chute 2. The dispersion feeder 3 has a conveyance surface 3a which has a conical shape diverging downward. The dispersion feeder 3 conveys the articles A discharged from the charge chute 2 to a top portion of the conveyance surface 3a such that the articles A uniformly shift toward an outer edge of the conveyance surface 3a by vibrating the conveyance surface 3a. The dispersion feeder 3 is directly or indirectly supported by the case 13.

The plurality of radial feeders 4 are disposed radially along the outer edge of the conveyance surface 3a of the dispersion feeder 3. Each of the radial feeders 4 has a trough 4a extending outward from below the outer edge of the conveyance surface 3a. Each of the radial feeders 4 conveys the article A discharged from the outer edge of the conveyance surface 3a toward a tip of the trough 4a by vibrating the trough 4a. The plurality of radial feeders 4 are directly or indirectly supported by the case 13.

Each of the plurality of pool hoppers 5 is detachably provided on the downstream side of the corresponding radial feeder 4. Specifically, each of the pool hoppers 5 is disposed below the tip of the trough 4a of the corresponding radial feeder 4, and is supported directly or indirectly by the case 13. Each of the pool hoppers 5 of the present embodiment is detachably attached to the case 13. Attachment and detachment of the pool hoppers 5 is achievable by a known ordinary mechanism, for example. Each of the pool hoppers 5 has a gate 5a openable and closable for the bottom of the pool hopper 5. Each of the pool hoppers 5 closes the gate 5a to receive the article A conveyed by the corresponding radial feeder 4. Each of the pool hoppers 5 also temporarily holds the received article A, and then opens the gate 5a to discharge the article A downstream.

Each of the plurality of weighing hoppers 6 is detachably provided on the downstream side of the corresponding pool hopper 5. Specifically, each of the weighing hoppers 6 is disposed below the gate 5a of the corresponding pool hopper 5, and is supported directly or indirectly by the case 13. Each of the weighing hoppers 6 of the present embodiment is detachably attached to the case 13. Each of the weighing hoppers 6 herein is detachably attached to a bracket or the like supported by a load cell 11a described below. Attachment and detachment of the weighing hoppers 6 is achievable by a known ordinary mechanism, for example. Each of the weighing hoppers 6 has a gate 6a and a gate 6b openable and closable for the bottom of the weighing hopper 6. Each of the weighing hoppers 6 closes the gates 6a and 6b to receive the article A discharged from the corresponding pool hopper 5. Each of the weighing hoppers 6 also temporarily holds the received article A, and then opens the gate 6a or the gate 6b to discharge the article A downstream.

Each of the plurality of booster hoppers 7 is detachably provided on the downstream side of the corresponding weighing hopper 6. Specifically, each of the booster hoppers 7 is disposed below the gate 6a of the corresponding weighing hopper 6, and is supported directly or indirectly by the frame 12. Each of the booster hoppers 7 of the present embodiment is detachably attached to the frame 12. Attachment and detachment of the booster hoppers 7 is achievable by a known ordinary mechanism, for example. Each of the booster hoppers 7 has a gate 7a openable and closable for the bottom of the booster hopper 7. Each of the booster hoppers 7 closes the gate 7a to receive the article A discharged from the gate 6a side of the corresponding weighing hopper 6. Each of the booster hoppers 7 also temporarily holds the received article A, and then opens the gate 7a to discharge the article A downstream.

The collection chute 8 has a tubular configuration having an inner surface 8a which constitutes a truncated cone tapering downward. The collection chute 8 is disposed such that the inner surface 8a is located below all the weighing hoppers 6 and all the booster hoppers 7. The collection chute 8 receives, via the inner surface 8a, the article A discharged from the gate 6b side of each of the weighing hoppers 6, and the article A discharged from each of the booster hoppers 7, and discharges the received articles A downstream. The collection chute 8 is directly or indirectly supported by the frame 12.

The timing hopper 9 is disposed below the collection chute 8. The timing hopper 9 has a gate 9a openable and closable for the bottom of the timing hopper 9. The timing hopper 9 closes the gate 9a to temporarily hold the article A discharged from the collection chute 8. Moreover, the timing hopper 9 opens the gate 9a to discharge the temporarily held article A to the bag forming and packaging machine 60. The timing hopper 9 is directly or indirectly supported by the frame 12.

The weighing unit 11 is disposed in the case 13. The weighing unit 11 has a plurality of the load cells 11a. Each of the plurality of load cells 11a is provided for the corresponding weighing hopper 6. Each of the load cells 11a supports the corresponding weighing hopper 6 via a support bracket or the like. The weighing unit 11 weighs the article A held in each of the plurality of weighing hoppers 6, and obtains a weighing value corresponding to mass of the corresponding article A. For example, the weighing unit 11 subtracts a tare weight from a weight detected by the load cell 11a supporting one of the weighing hoppers 6 to obtain a weighing value corresponding to mass of the article A held in the corresponding weighing hopper 6. The tare weight includes a weight of the weighing hopper 6, a weight of a residual or attached matter of the weighing hopper 6, and others.

The weighing unit 11 performs zero point correction of a weighing value corresponding to the mass of the article A held in the weighing hopper 6 (hereinafter also simply referred to as a "weighing value"). Zero point correction is a process for resetting a weighing value, which has been obtained in a state of discharge of the article A from the weighing hopper 6, to the zero point of the weighing value. For example, in zero point correction, a tare weight is reset to a weight detected by the load cell 11a in the state of discharge of the article A from the weighing hopper 6. The weighing unit 11 performs zero point correction at predetermined intervals. For example, the weighing unit 11 performs zero point correction once for each measurement of a weighing value of the article A ten times. For example, the weighing unit 11 may perform zero point correction once at intervals of one hour. In addition, according to the present embodiment, the weighing unit 11 performs zero point correction for a weighing value corresponding to mass of the article A held in a part of the weighing hoppers 6 when this part of the weighing hoppers 6 having been removed is again attached.

The notification unit 14 notifies an operator of various information related to the combination weighing device 1. The notification unit 14 notifies the operator of an error of a part of the plurality of weighing hoppers 6. The notification unit 14 is a display device such as a display or a tablet terminal having a display screen 14A (see FIG. 3). When an error of a part of the weighing hoppers 6 is detected, for example, the notification unit 14 notifies the operator of the error by displaying the error on the display screen 14A. Note that the notification unit 14 may be a speaker which outputs voices or the like, a sign pole capable of blinking or lighting, or others.

The control unit 20 is disposed in the case 13. The control unit 20 includes a central processing unit (CPU), a read only memory (ROM), a random access memory (RAM), and others. The control unit 20 controls operations of respective parts of the combination weighing device 1, such as conveyance operations of the dispersion feeder 3 and the radial feeders 4, opening and closing operation of the gate 5a of each of the pool hoppers 5, opening and closing operation of the gates 6a and 6b of each of the weighing hoppers 6, opening and closing operation of the gate 7a of each of the booster hoppers 7, and opening and closing operation of the gate 9a of the timing hopper 9. Note that the control unit 20 is communicably connected to the bag forming and packaging machine 60.

The control unit 20 stores a weighing value measured by the weighing unit 11, and the weighing hopper 6 and/or the booster hopper 7 in which the article A corresponding to the weighing value is held, while associating the weighing value and the weighing hopper 6 and/or the booster hopper 7 with each other. The control unit 20 performs combination calculation to select such a combination of weighing values a total value of which becomes a target weighing value from a plurality of weighing values measured by the weighing unit 11 and associated with the plurality of weighing hoppers 6 and/or booster hoppers 7. For example, combination calculation selects, from a plurality of weighing values obtained by the weighing unit 11, such a combination of weighing values a total value of which falls within a predetermined range having a lower limit corresponding to the target weighing value. The control unit 20 discharges the article A from the weighing hopper 6 and/or the booster hopper 7 associated with the combination.

The control unit 20 performs combination calculation based on a weighing value corresponding to mass of the article A held in each of the plurality of weighing hoppers 6, and continues combination calculation based on a weighing value corresponding to mass of the article A held in each of the weighing hoppers 6 other than a part of the weighing hoppers 6 (weighing hoppers 6 in the other part) in a state in which the part of the plurality of weighing hoppers 6 has been removed. The state in which the part of the weighing hoppers 6 has been removed can be detected by using the weighing unit 11. For example, the weighing unit 11 can detect removal of the part of the weighing hoppers 6 based on a state in which a detection value of the load cell 11*a* supporting the part of the weighing hoppers 6 becomes smaller than a threshold. In addition, a state in which a part of the weighing hoppers 6 has been attached can be detected by using the weighing unit 11. For example, the weighing unit 11 can detect attachment of the part of the weighing hoppers 6 based on a state in which a detection value of the load cell 11*a* supporting the part of the weighing hoppers 6 becomes equal to or larger than a threshold.

In a state in which a part of the weighing hoppers 6 has been removed, the control unit 20 stops a discharging operation of the pool hopper 5 on the upstream side of the part of the weighing hoppers 6, and a conveying operation of the radial feeder 4 on the upstream side of the part of the weighing hoppers 6. When the weighing unit 11 performs zero point correction in a state in which a part of the weighing hoppers 6 having been removed is again attached, the control unit 20 continues combination calculation based on a weighing value corresponding to mass of the article A held in each of the plurality of weighing hoppers 6 including the part of the weighing hoppers 6.

When an error of a part of the weighing hoppers 6 included in the plurality of weighing hoppers 6 is detected, the control unit 20 starts combination calculation based on a weighing value corresponding to mass of the article A held in each of the weighing hoppers 6 other than the part of the weighing hoppers 6. When removal of a part of the weighing hoppers 6 included in the plurality of weighing hoppers 6 is detected, the control unit 20 starts combination calculation based on a weighing value corresponding to mass of the article A held in each of the weighing hoppers 6 other than the part of the weighing hoppers 6. When an operation for removing a part of the weighing hoppers 6 included in the plurality of weighing hoppers 6 from combination calculation is input, the control unit 20 starts combination calculation based on a weighing value corresponding to mass of the article A held in each of the weighing hoppers 6 other than the part of the weighing hoppers 6. The foregoing processing performed by the control unit 20 will be described below.

An operation performed by the combination weighing device 1 will be now described based on one scene during operation presented by way of example.

Figure 2:
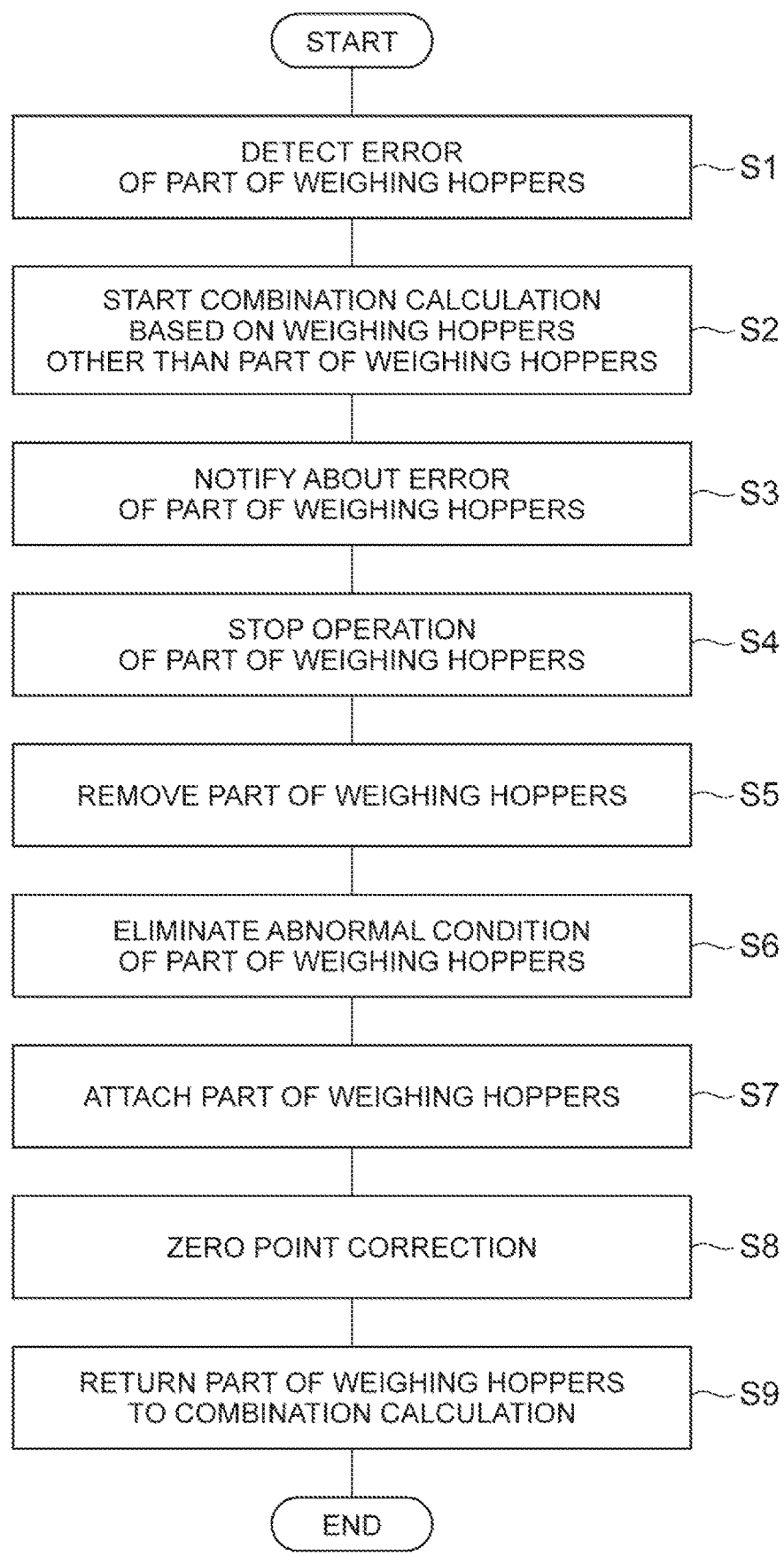
FIG. 2 is a flowchart showing an example of a weighing method using the combination weighing device in FIG. 1.

For example, an abnormal condition may be caused in a part (e.g., one) of the plurality of weighing hoppers 6 of the combination weighing device 1. In this scene, an error of the part of the weighing hoppers 6 is detected as shown in FIG. 2 (step S1). Examples of the error of the weighing hopper 6 include an error during zero point correction by the weighing unit 11, over-scaling of the weighing hoppers 6, and a driving error in operating the weighing hoppers 6.

The error during zero point correction is an error detected when a tare weight reset by the zero point correction is larger than a previous tare weight by a predetermined amount. The over-scaling is an error detected when a weighing value exceeds a predetermined range corresponding to the target weighing value. The driving error is an error detected when a step out or the like is caused in a driving unit (e.g., motor) for implementing the discharging operation of the weighing hoppers 6.

When an error of a part of the weighing hoppers 6 is detected, the control unit 20 starts combination calculation based on a weighing value corresponding to mass of the article A held in each of the weighing hoppers 6 other than the part of the weighing hoppers 6 (step S2). More specifically, the control unit 20 removes the part of the weighing hoppers 6 corresponding to the detected error from combination calculation.

Figure 3:
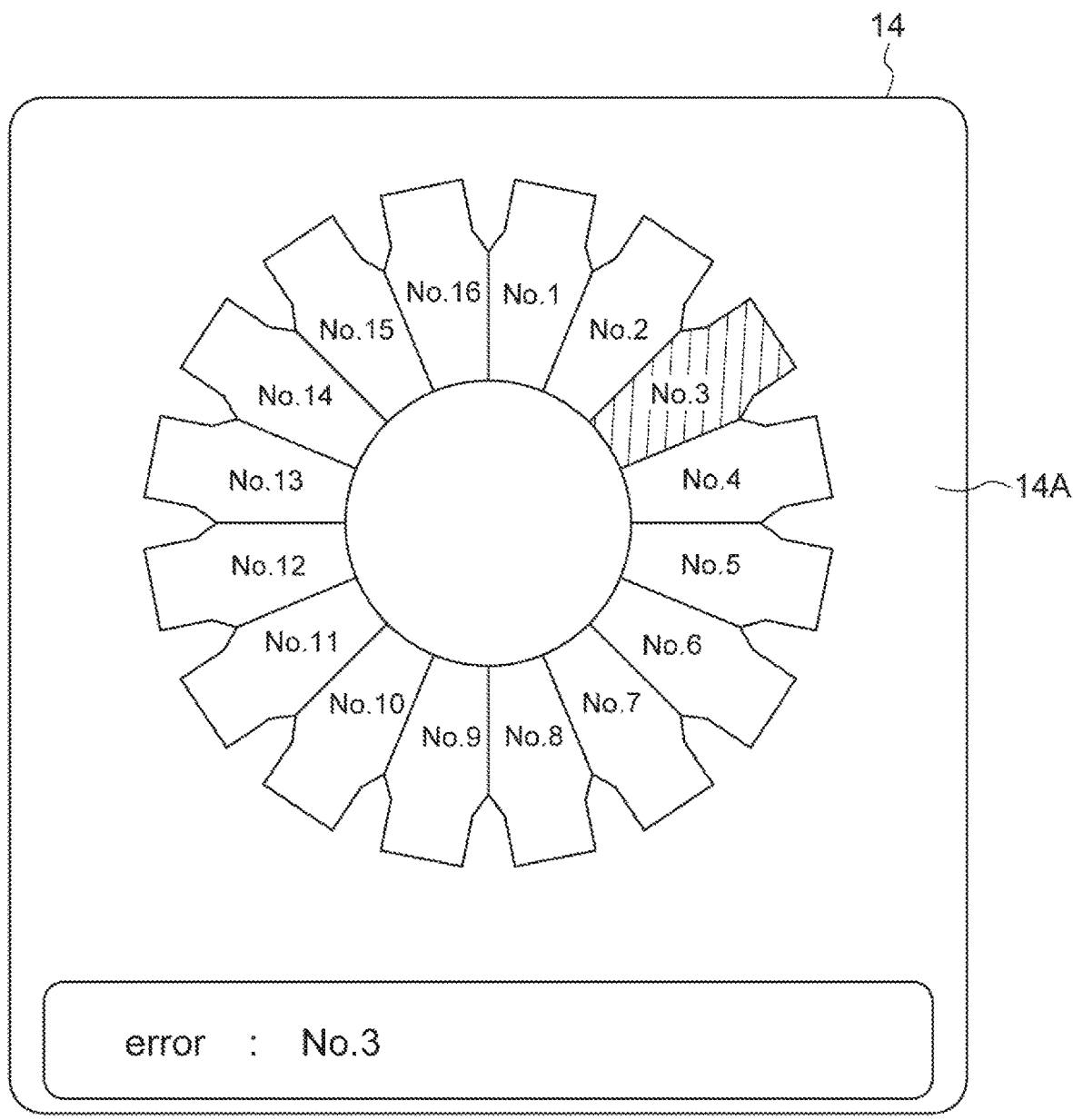
FIG. 3 is a diagram showing a display screen of a notification unit included in the combination weighing device in FIG. 1.

When an error of a part of the weighing hoppers 6 is detected, the notification unit 14 gives notification about the error (step S3). For example, the notification unit 14 displays, on the display screen 14A, a position and a number of the part of the weighing hoppers 6 corresponding to the detected error as shown in FIG. 3. The operator can check the part of the weighing hoppers 6 corresponding to the detected error by visual recognition of the display screen 14A. Note that FIG. 3 indicates the position of the weighing hopper 6 corresponding to the detected error by hatching, and the number "3" allocated to the corresponding weighing hopper 6 in an example of the combination weighing device 1 including the 16 weighing hoppers 6.

When an error of a part of the weighing hoppers 6 is detected, the control unit 20 stops the discharging operation of the part of the weighing hoppers 6 (step S4). In step S4, the control unit 20 also stops a discharging operation of the pool hopper 5 on the upstream side of the part of the weighing hopper 6, and a conveying operation of the radial feeder 4 on the upstream side of the part of the weighing hoppers 6. The control unit 20 continues the discharging operation of the weighing hoppers 6 other than the part of the weighing hoppers 6. Note that steps S2, S3 and S4 may be performed in no particular order or may be performed simultaneously.

Figure 4:
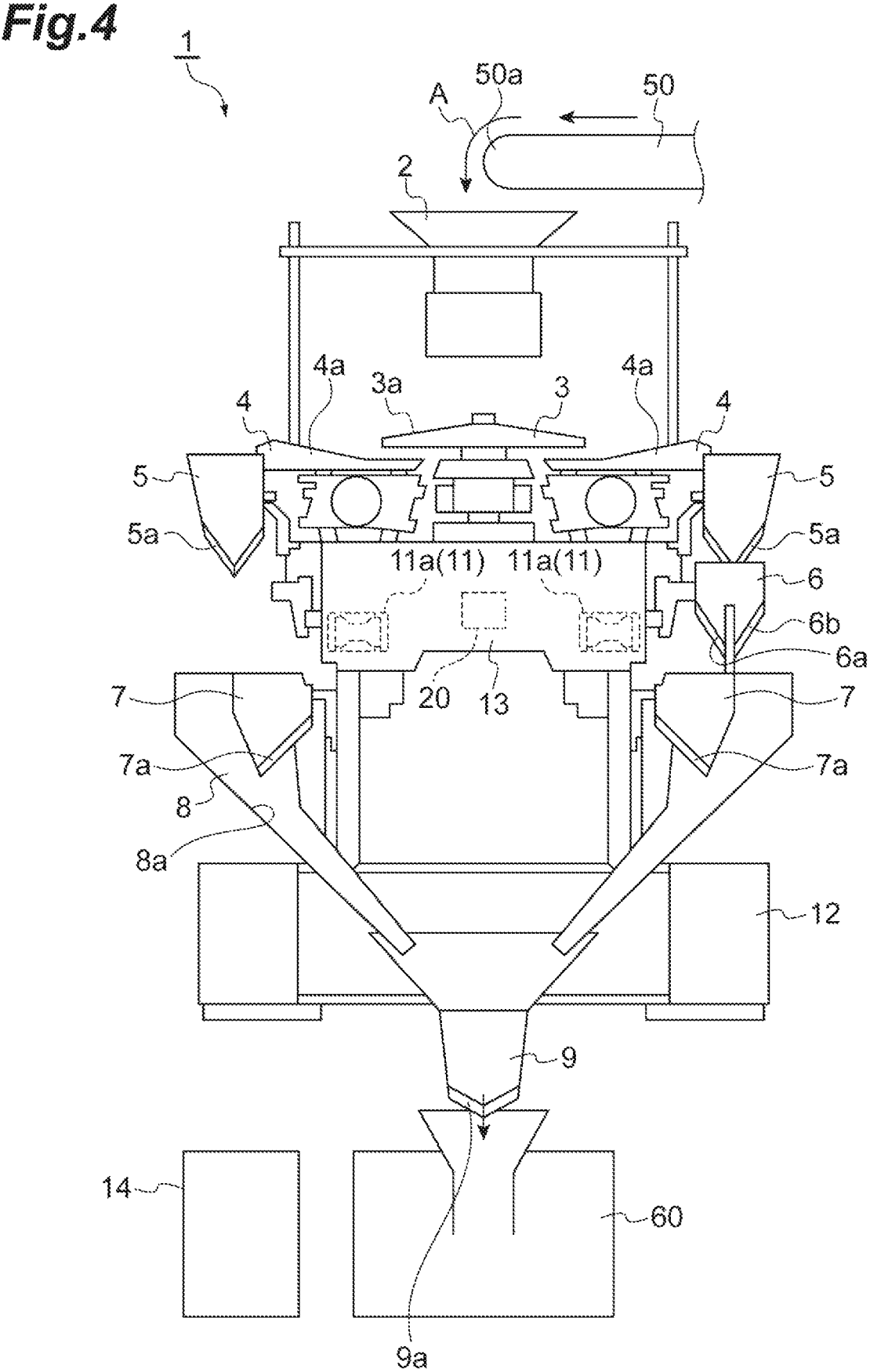
FIG. 4 is a configuration diagram showing a state in which weighing hoppers of the combination weighing device in FIG. 1 are removed.

Subsequently, the part of the weighing hoppers 6 is removed by the operator (see step S5 in FIG. 4). Removal of the part of the weighing hoppers 6 can be detected by using the weighing unit 11. In the state in which the part of the weighing hoppers 6 has been removed, the control unit 20 continues combination calculation based on the weighing value corresponding to the mass of the article A held in each of the weighing hoppers 6 other than the part of the weighing hoppers 6, and continues the stop of the respective operations of the pool hopper 5 and the radial feeder 4 on the upstream side of the part of the weighing hoppers 6.

Subsequently, the abnormal condition of the part of the weighing hoppers 6 is eliminated by the operator (step S6). When the error of the weighing hopper 6 is an error during zero point correction, for example, the residual or attached matter of the weighing hopper 6 is removed. When the error of the weighing hopper 6 is over-scaling, for example, the article A held in the weighing hopper 6 is discarded to a defective box or the like. When the error of the weighing hopper 6 is a driving error, for example, the driving unit is repaired or replaced. Subsequently, the part of the weighing hoppers 6 is again attached by the operator (step S7). The state in which the part of the weighing hoppers 6 has been attached can be detected by using the weighing unit 11. When attachment of the part of the weighing hoppers 6 again is detected, the weighing unit 11 considers that the article A is not held in the part of the weighing hoppers 6, and performs zero point correction of the weighing value of the part of the weighing hoppers 6 (weighing value obtained by the weighing unit 11 in accordance with the mass of article A held in the part of the weighing hoppers 6) (step S8).

Subsequently, the control unit 20 returns (adds) the attached part of the weighing hoppers 6 to combination calculation (step S9). Specifically, after the weighing unit 11 performs zero point correction in the state in which the removed part of the weighing hoppers 6 has been attached, the control unit 20 operates the pool hopper 5 and the radial feeder 4 on the upstream side of the part of the weighing hoppers 6 to supply the article A to the part of the weighing hoppers 6, and continues combination calculation based on the weighing value corresponding to the mass of the article A held in each of the plurality of weighing hoppers 6 including the part of the weighing hoppers 6 (i.e., returns the part of the weighing hoppers 6 to combination calculation, and simultaneously restarts supply of the article A to the part of the weighing hoppers 6).

Figure 5:
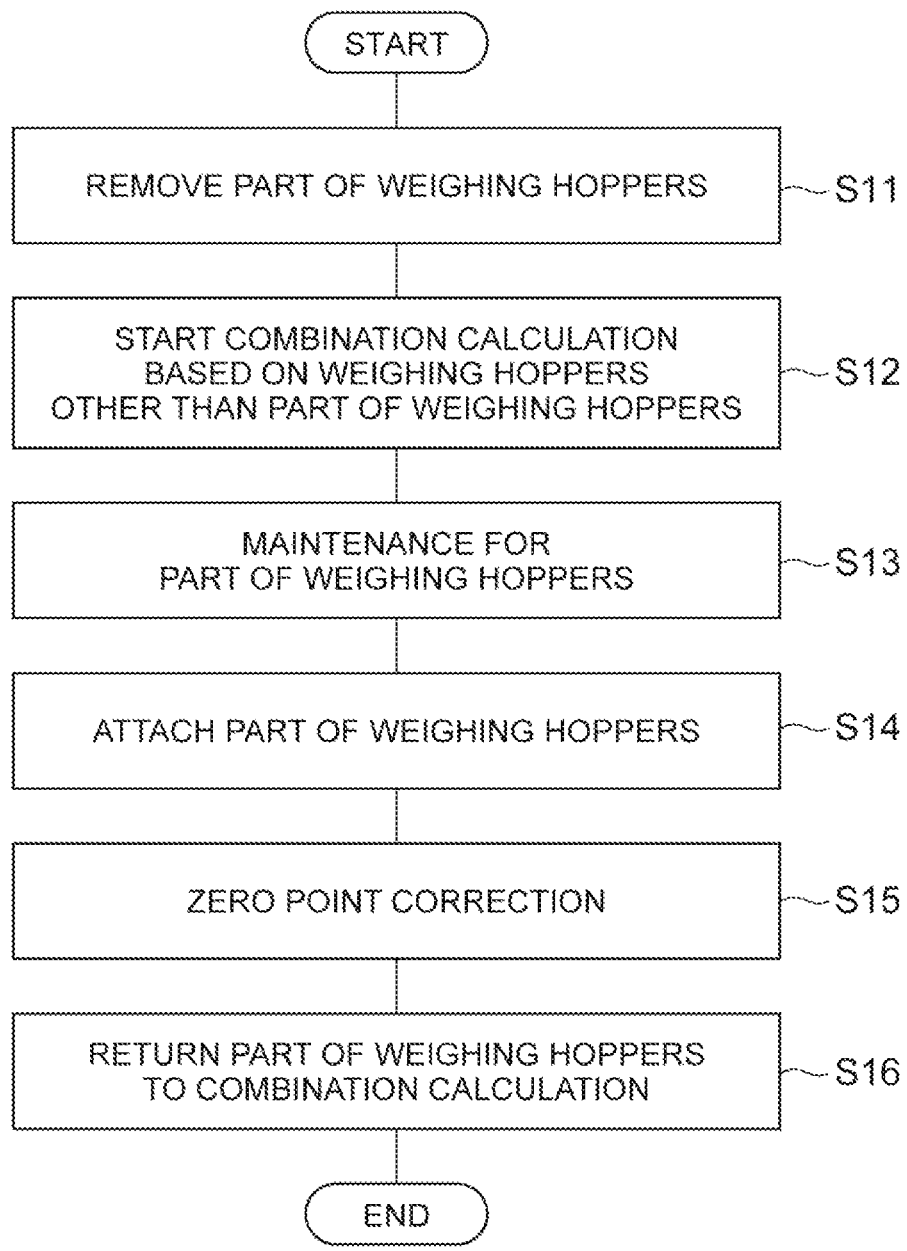
FIG. 5 is a flowchart showing an example of the weighing method using the combination weighing device in FIG. 1.

In addition, a part of the weighing hoppers 6 of the combination weighing device 1 may be removed by the operator for maintenance such as cleaning during operation of the combination weighing device 1. In this scene, the part of the weighing hoppers 6 is removed by the operator during operation of the combination weighing device 1 as shown in FIG. 5 (step S11). When removal of the part of the weighing hoppers 6 is detected, the control unit 20 starts combination calculation based on a weighing value corresponding to mass of the article A held in each of the weighing hoppers 6 other than the part of the weighing hoppers 6 (step S12). In step S12, the control unit 20 stops respective operations of the pool hopper 5 and the radial feeder 4 on the upstream side of the part of the weighing hoppers 6.

In the state in which the part of the weighing hoppers 6 has been removed, the control unit 20 continues combination calculation based on the weighing value corresponding to the mass of the article A held in each of the weighing hoppers 6 other than the part of the weighing hoppers 6, and continues the stop of the respective operations of the pool hopper 5 and the radial feeder 4 on the upstream side of the part of the weighing hoppers 6.

Subsequently, maintenance is performed for the part of the weighing hoppers 6 (step S13). When a residual or attached matter is present in the weighing hopper 6, for example, the residual or attached matter is removed. Subsequent steps S14 to S16 are similar to steps S7 to S9, respectively.

Figure 6:
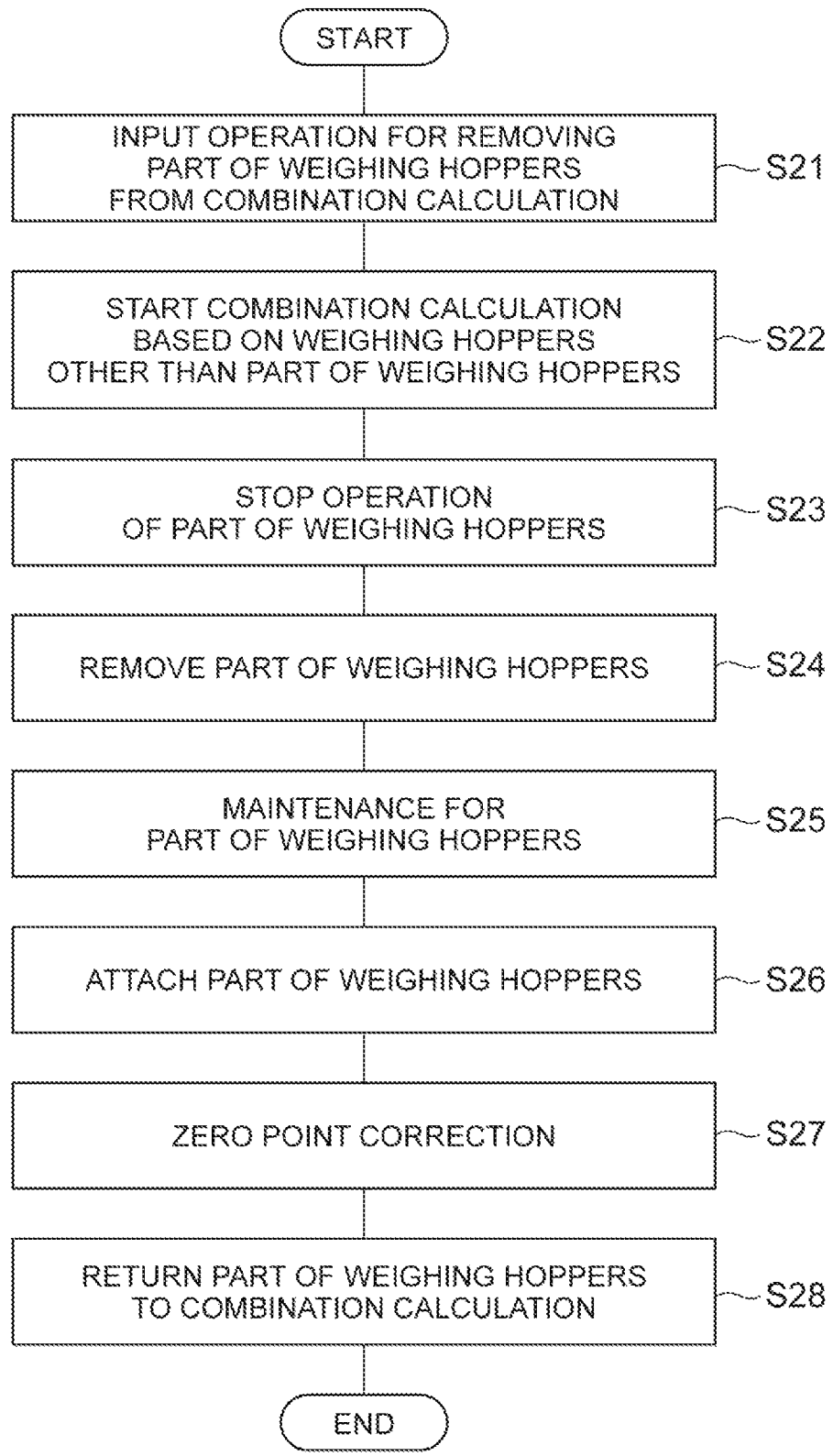
FIG. 6 is a flowchart showing an example of the weighing method using the combination weighing device in FIG. 1.

In addition, a part of the weighing hoppers 6 of the combination weighing device 1 may be removed from combination calculation by the operator for maintenance such as cleaning during operation of the combination weighing device 1. In this scene, an operation for removing the part of the weighing hoppers 6 from combination calculation is input by the operator during operation of the combination weighing device 1 as shown in FIG. 6 (step S21). This operation can be input via an operation input unit of the combination weighing device 1.

When the operation for removing the part of the weighing hoppers 6 from combination calculation is input, the control unit 20 starts combination calculation based on a weighing value corresponding to mass of the article A held in each of the weighing hoppers 6 other than the part of the weighing hoppers 6 (step S22). When the operation for removing the part of the weighing hoppers 6 from combination calculation is input, the control unit 20 stops the operation of the part of the weighing hoppers 6 (step S23). In step S23, the control unit 20 also stops the respective operations of the pool hopper 5 and the radial feeder 4 on the upstream side of the part of the weighing hoppers 6.

Subsequently, the part of the weighing hoppers 6 is removed by the operator (step S24). In the state in which the part of the weighing hoppers 6 has been removed, the control unit 20 continues combination calculation based on the weighing value corresponding to the mass of the article A held in each of the weighing hoppers 6 other than the part of the weighing hoppers 6, and continues the stop of the respective operations of the pool hopper 5 and the radial feeder 4 on the upstream side of the part of the weighing hoppers 6.

Subsequently, maintenance is performed for the part of the weighing hoppers 6 (step S25). When a residual or attached matter is present in the weighing hopper 6, for example, the residual or attached matter is removed. Subsequent steps S26 to S28 are similar to steps S7 to S9, respectively.

According to the combination weighing device 1 described above, the control unit 20 performs combination calculation based on a weighing value corresponding to mass of the article A held in each of the plurality of weighing hoppers 6, and continues combination calculation based on a weighing value corresponding to mass of the article A held in each of the weighing hoppers 6 other than a part of the weighing hoppers 6 in a state in which the part of the plurality of weighing hoppers 6 has been removed. Accordingly, even in the state in which a part of the weighing hoppers 6 has been removed to eliminate an abnormal condition currently caused, for example, combination calculation can be continued based on the weighing hoppers 6 other than the part of the weighing hoppers 6 without stopping the combination weighing device 1. Accordingly, an operation rate drop is avoidable.

According to the combination weighing device 1, the weighing unit 11 performs zero point correction for a weighing value corresponding to a part of the weighing hoppers 6 when the part of the weighing hoppers 6 is attached after removal. In this manner, zero point correction of the weighing values of the part of the weighing hoppers 6 is performed to reduce a zero point error of the weighing unit 11 without stopping the combination weighing device 1 after the part of the weighing hoppers 6 are attached.

According to the combination weighing device 1, the control unit 20 continues combination calculation based on a weighing value corresponding to mass of the article A held in each of the plurality of weighing hoppers 6 including a part of the weighing hoppers 6 when the weighing unit 11 performs zero point correction in a state in which the part of the weighing hoppers 6 after removal is again attached. In this manner, the part of the weighing hoppers 6 can be again added to combination calculation without stopping the combination weighing device 1 after attachment of the part of the weighing hoppers 6 and zero point correction by the weighing unit 11.

When removal of a part of the weighing hoppers 6 included in the plurality of weighing hoppers 6 is detected in the combination weighing device 1, the control unit 20 starts combination calculation based on a weighing value corresponding to mass of the article A held in each of the weighing hoppers 6 other than the part of the weighing hoppers 6. In this manner, combination calculation based on the weighing value corresponding to the mass of the article A held in each of the weighing hoppers 6 other than the part of the weighing hoppers 6 can be started in response to the removal of the part of the weighing hoppers 6.

When an error of a part of the weighing hoppers 6 included in the plurality of weighing hoppers 6 is detected in the combination weighing device 1, the control unit 20 starts combination calculation based on a weighing value corresponding to mass of the article A held in each of the weighing hoppers 6 other than the part of the weighing hoppers 6. In this manner, combination calculation based on the weighing value corresponding to the mass of the article A held in each of the weighing hoppers 6 other than the part of the weighing hoppers 6 can be started in response to the error of the part of the weighing hoppers 6.

When an operation for removing a part of the weighing hoppers 6 included in the plurality of weighing hoppers 6 from combination calculation is input, the control unit 20 of the combination weighing device 1 starts combination calculation based on a weighing value corresponding to mass of the article A held in each of the weighing hoppers 6 other than the part of the weighing hoppers 6. In this manner, combination calculation based on the weighing value corresponding to the mass of the article A held in each of the weighing hoppers 6 other than the part of the weighing hoppers 6 can be started in response to input of the operation for removing the part of the weighing hoppers 6 from combination calculation.

In a state in which a part of the weighing hoppers 6 has been removed, the control unit 20 of the combination weighing device 1 stops a discharging operation of the pool hopper 5 on the upstream side of the part of the weighing hopper 6, and a conveying operation of the radial feeder 4 on the upstream side of the part of the weighing hoppers 6. In this manner, continuous supply of the articles A to the attachment positions of the articles A is avoidable even after removal of the weighing hoppers 6.

The combination weighing device 1 includes the notification unit 14 which gives notification about an error of a part of the weighing hoppers 6. In this case, an error of a part of the weighing hoppers 6 included in the plurality of weighing hoppers 6 can be easily checked. Accordingly, the part of the weighing hoppers 6 can be easily removed from the plurality of weighing hoppers 6, for example.

According to the combination weighing device 1 described above, the weighing hoppers 6 are attachable to and detachable from the case 13. In this case, an abnormal condition can be eliminated after detachment of a part of the weighing hoppers 6 corresponding to the abnormal condition and discharge of the article A held in the corresponding weighing hopper 6. Accordingly, in comparison with a case where the weighing hoppers 6 are fixed to the case 13 (the article A needs to be discharged in a state in which the weighing hoppers 6 are attached to the case 13), the necessity of providing an actuator or the like for discharging the articles A from the weighing hoppers 6 is eliminated. Size reduction and cost reduction of the device are therefore achievable.

While the specific embodiment has been described, one aspect of the present invention is not limited to the embodiment described herein.

Removal of the weighing hoppers 6 and attachment of the weighing hoppers 6 are not required to be detected by the weighing unit 11. Removal of the weighing hoppers 6 and attachment of the weighing hoppers 6 may be detected by a detection unit separately provided. For example, this detection unit may be constituted of a proximity sensor or the like provided for each of the plurality of weighing hoppers 6.

In a state in which a part of the pool hoppers 5 have been removed from the plurality of pool hoppers 5, the control unit 20 may continue combination calculation based on a weighing value corresponding to mass of the article A held in each of the weighing hoppers 6 other than the weighing hoppers 6 on the downstream side of the part of the pool hoppers 5. In this manner, combination calculation can continue without an operation rate drop of the combination weighing device 1 even in the state in which the part of the pool hoppers 5 has been removed from the plurality of pool hoppers 5. In this case, the combination weighing device 1 further includes a detection unit which detects attachment and detachment of each of the plurality of pool hoppers 5. For example, this detection unit may be constituted of a proximity sensor or the like provided for each of the plurality of pool hoppers 5.

In a state in which a part of the booster hoppers 7 has been removed from the plurality of booster hoppers 7, the control unit 20 may continue combination calculation based on a weighing value corresponding to mass of the article A held in each of the weighing hoppers 6 other than the weighing hopper 6 on the upstream side of the part of the booster hoppers 7. In this manner, combination calculation can continue without an operation rate drop of the combination weighing device 1 even in the state in which the part of the booster hoppers 7 has been removed from the plurality of booster hoppers 7. In this case, the combination weighing device 1 further includes a detection unit which detects attachment and detachment of each of the plurality of booster hoppers 7. For example, this detection unit may be constituted of a proximity sensor or the like provided for each of the plurality of booster hoppers 7.

The control unit 20 may start combination calculation based on a weighing value corresponding to mass of the article A held in each of the weighing hoppers 6 other than the weighing hoppers 6 on at least one of occasions of detection of an error of a part of the weighing hoppers 6, detection of removal of a part of the weighing hoppers 6, and input of operation for removing a part of the weighing hoppers 6 from combination calculation.

In the state in which a part of the weighing hoppers 6 is removed during operation of the combination weighing device 1, the control unit 20 is not required to stop the respective operations of the pool hopper 5 and the radial feeder 4 on the upstream side of the part of the weighing hoppers 6 depending on circumstances.

Provided according to one aspect of the present invention is a combination weighing device capable of reducing an operation rate drop.

What is claimed is:
1. A combination weighing device comprising:
a conveyance unit configured to convey an article;
a plurality of first hoppers each configured to receive the article conveyed by the conveyance unit, temporarily hold the received article, and then discharge the article downstream;
a plurality of second hoppers detachably provided on a downstream side of the plurality of first hoppers, and each of the plurality of second hoppers configured to receive the article discharged from corresponding one of the plurality of first hoppers, temporarily hold the received article, and then discharge the article downstream;
a weighing unit configured to weigh the article held in each of the plurality of second hoppers, and obtain a weighing value corresponding to mass of the article; and
a control unit configured to perform combination calculation to select such a combination of weighing values a total value of which becomes a target weighing value, and discharge the article from second hoppers of the plurality of second hoppers corresponding to the combination,
wherein
the control unit performs the combination calculation based on the weighing value corresponding to the mass of the article held in each of the plurality of second hoppers, and when at least one of the plurality of second hoppers is removed, the control unit continues the combination calculation based on the weighing value corresponding to the mass of the article held in each of the plurality of second hoppers other than the part of the at least one removed second hopper, stops a discharging operation of the first hopper on an upstream side of the at least one removed second hopper, and stops a conveying operation of the conveying unit on the upstream side of the at least one removed second hopper.

2. The combination weighing device according to claim 1, wherein the weighing unit performs zero point correction of the weighing value obtained by the weighing unit and corresponding to the mass of the article held in the at least one removed second hopper when the at least one removed second hopper is reattached.

3. The combination weighing device according to claim 2, wherein the control unit continues the combination calculation based on the weighing value corresponding to the mass of the article held in each of the plurality of second hoppers including the at least one reattached second hopper when the weighing unit performs the zero point correction.

4. The combination weighing device according to claim 1, wherein the control unit starts the combination calculation based on the weighing value corresponding to the mass of the article held in each of the second hoppers other than the at least one removed second hopper when it is detected that the at least one second hopper is removed.

5. The combination weighing device according to claim 1, wherein when an error is detected on at least one of the plurality of second hoppers, the control unit starts the combination calculation based on the weighing value corresponding to the mass of the article held in each of the second hoppers other than the at least one errored second hopper of the plurality of second hoppers.

6. The combination weighing device according to claim 5, further comprising a notification unit configured to give notification about the at least one errored second hopper.

7. The combination weighing device comprising according to claim 6, wherein the notification unit comprises a display on which an arrangement of the plurality of second hoppers is displayed, and
a position of the at least one errored second hopper is indicated by hatching on the display of the notification unit.

8. The combination weighing device according to claim 1, wherein the control unit starts the combination calculation based on the weighing value corresponding to the mass of the article held in each of the plurality of second hoppers other than the at least one removed second hopper when an operation for removing the at least one second hopper from the combination calculation is input.

9. The combination weighing device according to claim 1, wherein
each of the plurality of first hoppers is detachably provided on a downstream side of the conveyance unit, and
when at least one of the plurality of first hoppers is removed, the control unit continues the combination calculation based on the weighing value corresponding to the mass of the article held in each of the plurality of second hoppers other than the second hopper on the downstream side of the at least one removed first hopper.

10. The combination weighing device according to claim 1, further comprising a plurality of third hoppers detachably provided on a downstream side of the plurality of second hoppers, and each configured to receive the article discharged from corresponding one of the plurality of second hoppers, temporarily hold the received article, and then discharge the article downstream, wherein
when at least one of the plurality of third hoppers is removed, the control unit continues the combination calculation based on the weighing value corresponding to the mass of the article held in each of the plurality of second hoppers other than the second hopper of the plurality of second hoppers on an upstream side of the at least one removed third hopper.

11. The combination weighing device according to claim 1, wherein the conveying unit includes a plurality of radial feeders, and each one of the plurality of radial feeders feeds a respective one of the plurality of first hoppers.

12. The combination weighing device according to claim 11, wherein stopping the conveying operation stops operation of a respective radial feeder of the plurality of radial feeders that conveys the article to the at least one removed second hopper.

* * * * *